(12) United States Patent
Paek et al.

(10) Patent No.: US 8,743,337 B2
(45) Date of Patent: Jun. 3, 2014

(54) FLEXIBLE DISPLAY SUBSTRATE MODULE AND METHOD OF MANUFACTURING FLEXIBLE DISPLAY DEVICE

(75) Inventors: Seung Han Paek, Incheon-si (KR); Kyoung Mook Lee, Seoul (KR); Kyung Lock Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 331 days.

(21) Appl. No.: 11/645,748

(22) Filed: Dec. 27, 2006

(65) Prior Publication Data

US 2008/0002118 A1 Jan. 3, 2008

(30) Foreign Application Priority Data

Jun. 30, 2006 (KR) .................. 10-2006-0060062

(51) Int. Cl.
*G02F 1/1333* (2006.01)
*G02F 1/13* (2006.01)

(52) U.S. Cl.
USPC ............ 349/158; 349/122; 349/138; 349/187

(58) Field of Classification Search
USPC .................................. 349/158, 122, 138, 187
See application file for complete search history.

(56) References Cited

U.S. PATENT DOCUMENTS

| | | | | |
|---|---|---|---|---|
| 6,831,727 B2 * | 12/2004 | Akiyama et al. | ............... | 349/158 |
| 7,148,944 B2 * | 12/2006 | Kinoshita et al. | ............ | 349/158 |
| 7,330,228 B2 * | 2/2008 | Kiguchi et al. | ............... | 349/106 |
| 2002/0135720 A1 * | 9/2002 | Yamanaka et al. | ........... | 349/122 |
| 2005/0057717 A1 * | 3/2005 | Rho | ............................ | 349/158 |
| 2006/0055314 A1 * | 3/2006 | Nakamura et al. | ............ | 313/500 |
| 2006/0207967 A1 * | 9/2006 | Bocko et al. | ..................... | 216/24 |

FOREIGN PATENT DOCUMENTS

| | | | | |
|---|---|---|---|---|
| JP | 2000-241822 | * | 9/2000 | .................... 349/158 |
| JP | 2000-241823 | A | 9/2000 | |
| JP | 2005521919 | A | 7/2005 | |
| KR | 1020040054010 | A | 6/2004 | |
| KR | 1020050027487 | A | 3/2005 | |
| WO | 03085448 | A1 | 10/2003 | |

OTHER PUBLICATIONS

Korean Office Action (Application No. 10-2006-0060062), dated Jun. 19, 2013.

* cited by examiner

*Primary Examiner* — Bumsuk Won
*Assistant Examiner* — Charles Chang
(74) *Attorney, Agent, or Firm* — Morgan, Lewis & Bockius LLP

(57) ABSTRACT

A flexible display substrate module includes a base substrate, an adhesive part on the base substrate, a flexible substrate adhering to the adhesive part, and a protective layer covering side surfaces of the flexible substrate and of the adhesive part.

7 Claims, 8 Drawing Sheets

FLEXIBLE DISPLAY SUBSTRATE MODULE AND METHOD OF MANUFACTURING FLEXIBLE DISPLAY DEVICE

This application claims the benefit of Korean Patent Application No. 10-2006-060062, filed on Jun. 30, 2006, which is hereby incorporated by reference in its entirety.

BACKGROUND OF THE INVENTION

1. Field of the Invention

Embodiments of the present invention relates to a display device, and more particularly to flexible display device. Embodiments of the present invention are suitable for a wide scope of applications. In particular, embodiments of the present invention are suitable for providing a substrate module for a flexible display device and a method of manufacturing a flexible display device using the substrate module.

2. Description of the Related Art

Recently, demand has been increasing for display devices that are light, thin, as well as wide and flat. A glass substrate is generally used in most flat display devices. The glass substrate is highly brittle. Accordingly, such display devices require a protective layer for the glass substrate. Moreover, such display device are difficult to bend for displaying an image.

A flexible substrate has recently been developed to fabricate a flexible display device. The flexible display device includes a plastic material or a metal foil in addition to the flexible substrate. However, displaying an image on the flexible display device is difficult in comparison to a glass substrate. The flexible substrate of the flexible display device often causes a misalignment when thin film transistors, pixel electrodes, and conductive lines are formed on the flexible substrate. Accordingly, the related art flexible substrate is usually attached to a hard substrate such as a glass substrate. Then, a thin film forming process and a thin film patterning process are performed.

The flexible display substrate includes a base substrate, a flexible substrate, and an adhesive part. The base substrate is generally a glass substrate. The base substrate prevents the flexible substrate from bending during the thin film forming process and the thin film patterning process.

The adhesive part is interposed between the base substrate and the flexible substrate to attach the flexible substrate to the base substrate. The flexible substrate provides some flexibility to the display device. The flexible substrate does not bend during a plurality of processes for manufacturing the flexible display device because the flexible substrate is attached to the base substrate. After forming and patterning the thin film, the flexible substrate is separated from the base substrate to complete the manufacture of the flexible display device.

However, during a cleaning and an etching process of the flexible substrate, the flexible substrate contacts to various etchants or chemicals. For example, a metal layer and a photoresist pattern are formed on the flexible substrate to form a pattern on the flexible substrate. Then, the metal layer is etched using the photoresist pattern as an etch mask. Various etchants or chemicals are used to pattern and remove the photoresist and pattern the metal layer.

When the flexible display substrate including the base substrate, the adhesive part, and the flexible substrate contacts the etchant. Hence, the adhesive part between the flexible substrate and the base substrate may be etched or dissolved by the etchant. Accordingly, an edge portion of the flexible substrate may be separated from the base substrate.

SUMMARY OF THE INVENTION

Accordingly, embodiments of the present invention are directed to a flexible display substrate module and a method of manufacturing a flexible display device using the same that substantially obviate one or more of the problems due to limitations and disadvantages of the related art.

An object of the present invention is to provide a flexible display substrate module capable of preventing separation of a flexible substrate from a supporting base substrate.

Another object of the present invention is to provide a method of manufacturing a flexible display device.

Additional features and advantages of the invention will be set forth in the description of exemplary embodiments which follows, and in part will be apparent from the description of the exemplary embodiments, or may be learned by practice of the exemplary embodiments of the invention. These and other advantages of the invention will be realized and attained by the structure particularly pointed out in the written description of the exemplary embodiments and claims hereof as well as the appended drawings.

To achieve these and other advantages and in accordance with the purpose of the present invention, as embodied and broadly described, a flexible display substrate module includes a base substrate, an adhesive part on the base substrate, a flexible substrate adhering to the adhesive part, and a protective layer covering side surfaces of the flexible substrate and of the adhesive part.

In another aspect, a method of manufacturing a flexible display device includes providing a base substrate, adhering an adhesive part to the base substrate, adhering a flexible substrate to the adhesive part, forming a protective layer covering side surfaces of the flexible substrate and of the adhesive part to form a flexible display substrate, and forming display elements on the flexible display substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of embodiments of the present invention and are incorporated in and constitute a part of this application, illustrate embodiments of the present invention and together with the description serve to explain the principle of embodiments of the present invention. In the drawings.

DETAILED DESCRIPTION OF EXEMPLARY EMBODIMENTS

Reference will now be made in detail to the exemplary embodiments of the present invention, which are illustrated in the accompanying drawings. Wherever possible, the same reference numbers will be used throughout the drawings to refer to the same or like parts. In embodiments of the present invention, a "flexible display device" is defined as a display device that can be bent or rolled.

Figure 1:
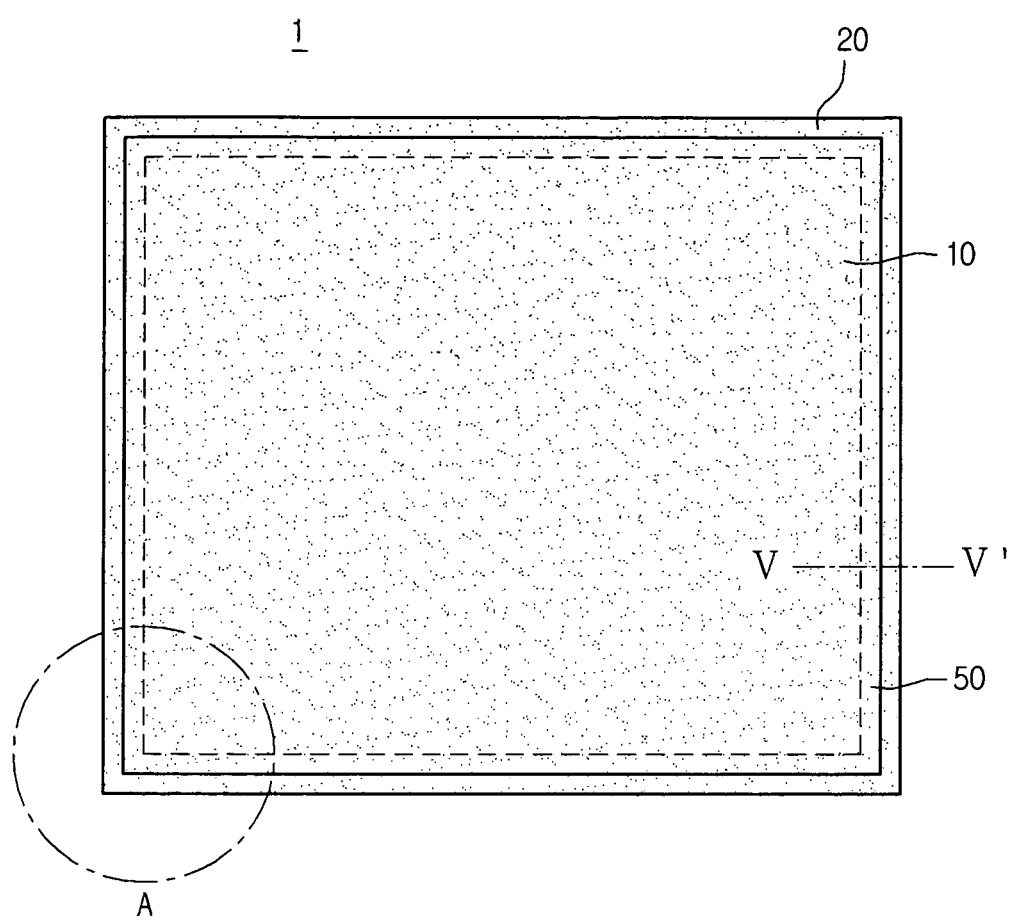
FIG. 1 shows a planar view of an exemplary flexible display substrate module according to an embodiment of the present invention.

FIG. 1 shows a planar view of an exemplary flexible display substrate module according to an embodiment of the present invention. Referring to FIG. 1, a flexible display substrate module 1 includes a flexible substrate 10 and a base substrate 20. A first surface area of the base substrate 20 may be substantially larger than a second surface area of the flexible substrate 10. The flexible substrate 10 may be attached to the base substrate 20. The flexible substrate 10 may be separated from the base substrate 20 when display elements are formed thereon.

The flexible substrate 10 may be formed of a flexible material such as a synthetic resin or a metal foil for easy bending by an external force. The flexibility of the flexible substrate 10 may be restricted while forming the display elements on the flexible substrate 10 to prevent damages to the display elements. For example, the flexible substrate 10 may be attached to the base substrate 20, for example a glass or a quartz material, which does not bend. The flexible substrate 10 may be attached to the base substrate 20 with an adhesive part. Attaching the flexible substrate 10 to the base substrate 20 prevents damages to the flexible substrate 10 and/or failure of the display elements when transporting the flexible substrate 10.

Figure 2A:
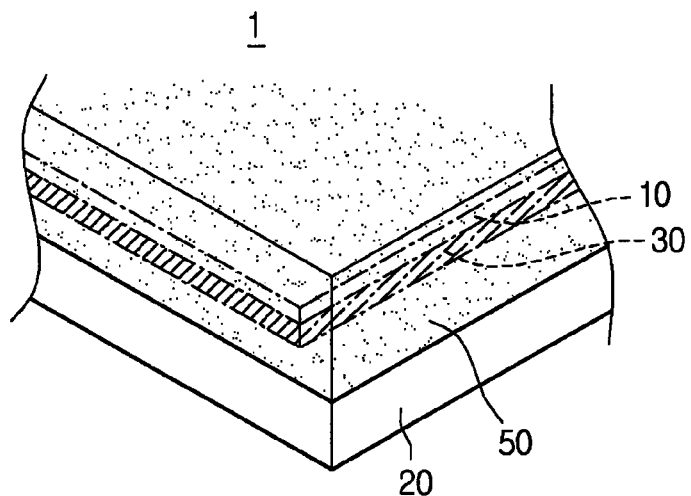
FIG. 2A shows an enlarged view of portion "A" from FIG. 1.
Figure 2B:
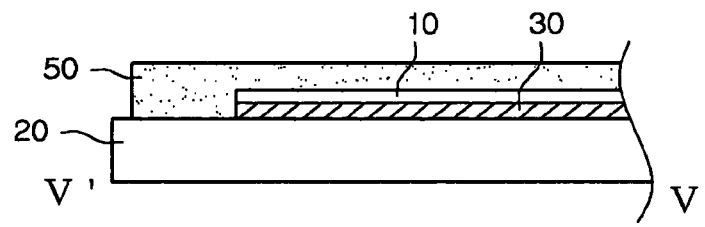
FIG. 2B shows a cross-sectional view taken along a line V-V' in FIG. 1.

FIG. 2A shows an enlarged view of portion "A" from FIG. 1. FIG. 2B shows a cross-sectional view taken along a line V-V' in FIG. 1. Referring to FIGS. 2A and 2B, the flexible substrate 10 may be attached to the base substrate 20 using an adhesive part 30. The adhesive part 30 may have a first adhesive force with respect to the base substrate 20. The adhesive part 30 may have a second adhesive force lower than the first adhesive force with respect to the flexible substrate 10. The adhesive part 30 may also be also include a flexible material. For example, the adhesive part 30 may provide an elastic as well as an adhesive force.

When particles are disposed on an interfacing surface between the adhesive part 30 and the base substrate 20, the base substrate 20 may be separated from the adhesive part 30. Similarly, when particles are disposed on an interfacing surface between the adhesive part 30 and the flexible substrate 10, the flexible substrate may be separated from the adhesive part 30. Thus, foreign substances or particles should not be included in the interfacing surface between the adhesive part 30 and the base substrate 20 and the interfacing surface between the adhesive part 30 and the flexible substrate 10 to prevent separation of the adhesive part 30 from the flexible substrate 10 or the base substrate 20. In addition, the adhesive part 30 may be damaged by etchants or chemicals causing separation from the base substrate 20.

In an embodiment, the flexible display substrate module 1 includes a protective layer 50 to prevent the adhesive part 30 from being etched and damaged by etchants or chemicals. The protective layer 50 may cover an exposed upper surface of the base substrate 20, exposed side surfaces of the adhesive part 30, and an upper surface of the flexible substrate 10. The protective layer 50 may include an organic layer having a chemically/mechanically stable characteristic with respect to the etchants.

The protective layer 50, for example, has a first portion and a second portion. The first portion faces the side surfaces of the flexible substrate 10, and the second portion faces the top surface of the flexible substrate 10. The second portion of the protective layer 50 may be thicker than the first portion of the protective layer 50.

The protective layer 50 protects the adhesive part 30 from the damage due to etchants or chemicals. The protective layer 50 also prevent the flexible substrate 10 from being separated from the base substrate 20 due to penetration of foreign substances such as the particles into the interfacing surface between the adhesive part 30 and the base substrate 20, and the interfacing substrate between the adhesive part 30 and the flexible substrate 10. In addition, the protective layer 50 also planarizes a surface of the flexible substrate 10.

In an embodiment of the present invention, one flexible substrate 10 may be used. In another embodiment of the present invention, at least two flexible substrates 10 may be disposed on the base substrate 20.

Figure 3A:
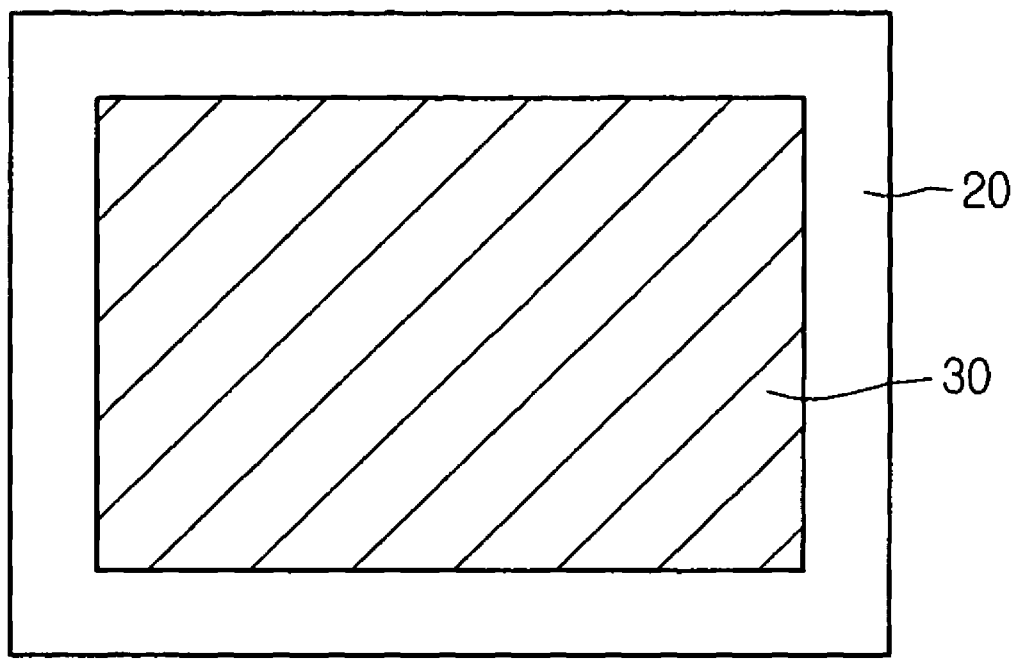
FIG. 3A shows planar and cross-sectional views respectively of a first exemplary step in a method of manufacturing a flexible display device according to an embodiment of the present invention.
Figure 3A:
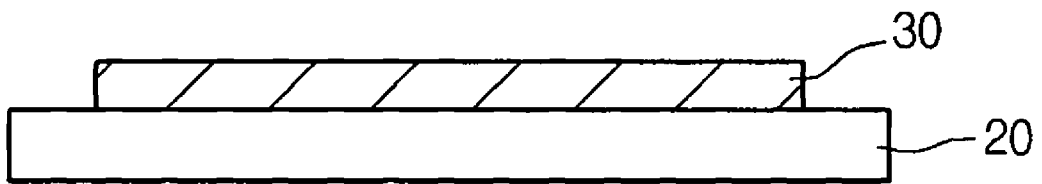

FIG. 3A shows planar and cross-sectional views respectively of a first exemplary step in a method of manufacturing a flexible display device according to an embodiment of the present invention. Referring to FIG. 3A, a base substrate 20 is provided. The base substrate 20 may include a glass substrate or a quartz substrate, and may substantially have a rectangular shape. Then, an adhesive part 30 is disposed on the base substrate 20. The adhesive part 30 may be shaped as a film and a first surface of the adhesive part 30 may be attached to the base substrate 20. The adhesive part 30 provides both flexibility and adhesive properties. For example, the protective layer may include one of a thermosetting material and a light curable material. Moreover, the base substrate 20 and the adhesive part 30 may be separated from each other by a solution.

In an embodiment of the present invention, a release paper (not shown) may be formed on a second surface facing the first surface of the adhesive part 30. The release paper may be temporarily attached until a flexible substrate 10 (shown in FIG. 2A) to be described later may be attached to the second surface of the adhesive part 30. Therefore, the release paper prevents particles from being attached to the adhesive part 30. Accordingly, damages such as scratches to the adhesive part 30 can be prevented. Moreover, deformation of the adhesive part 30 prior to the attachment of the flexible substrate 10 is also prevented.

Meanwhile, the attachment force between the adhesive part 30 and the base substrate 20 may be improved by pressing an upper surface of the release paper with a roller after attaching the adhesive part 30 to the base substrate 20. Also, as the adhesive part 30 is pressed with a roller, the adhesive part 30 may be formed to be thin and more uniformly spread on the base substrate 20.

Still referring to FIG. 3A, after the base substrate 20 is attached to the adhesive part 30, the release paper is detached from the adhesive part 30.

Figure 3B:
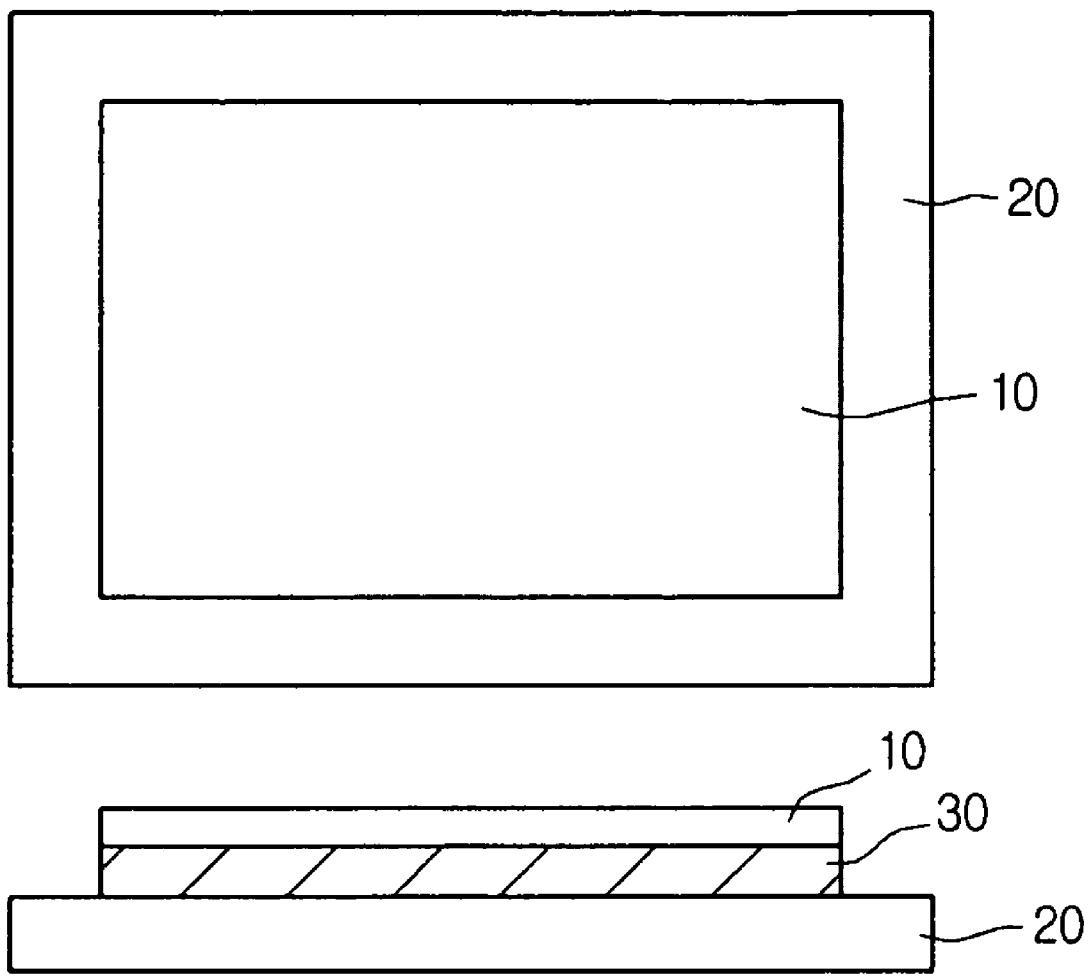
FIG. 3B shows planar and cross-sectional views respectively of a second exemplary step in a method of manufacturing a flexible display device according to an embodiment of the present invention.

FIG. 3B shows planar and cross-sectional views respectively of a second exemplary step in a method of manufacturing a flexible display device according to an embodiment of the present invention. Referring to FIG. 3B, a flexible substrate 10 is attached to an upper surface of the adhesive part 30. After the flexible substrate 10 is disposed on the adhesive part 30, the flexible substrate 10 may be also pressed with a roller, thereby improving the adhesion of the flexible substrate 10 to the adhesive part 30.

In an embodiment, the adhesive part 30 may include first and second adhesive materials. For example, the first adhesive material is adhered to the base substrate 20 and the second adhesive material is adhered to the flexible substrate 10. In this embodiment, the first adhesive material and the second adhesive material may have adhesive forces different from each other.

Alternatively, the adhesive part 30 may have a base film, a first adhesive layer, and a second adhesive layer. The first adhesive layer may be coated on a first surface of the base film and the second adhesive layer may be coated on a second surface opposite to the first face. The first adhesive layer may have a first adhesive force and the second adhesive layer may have a second adhesive force different from the first adhesive force. For example, the first adhesive layer may be attached to the base substrate 20 and the second adhesive layer may be attached to the flexible substrate 10. The first adhesive layer may have a first adhesive force and the second adhesive layer may have a second adhesive force smaller than the first adhesive force. Because the second adhesive force is smaller than the first adhesive force, the flexible substrate 10 may easily be separated from the adhesive part 30.

Figure 3C:
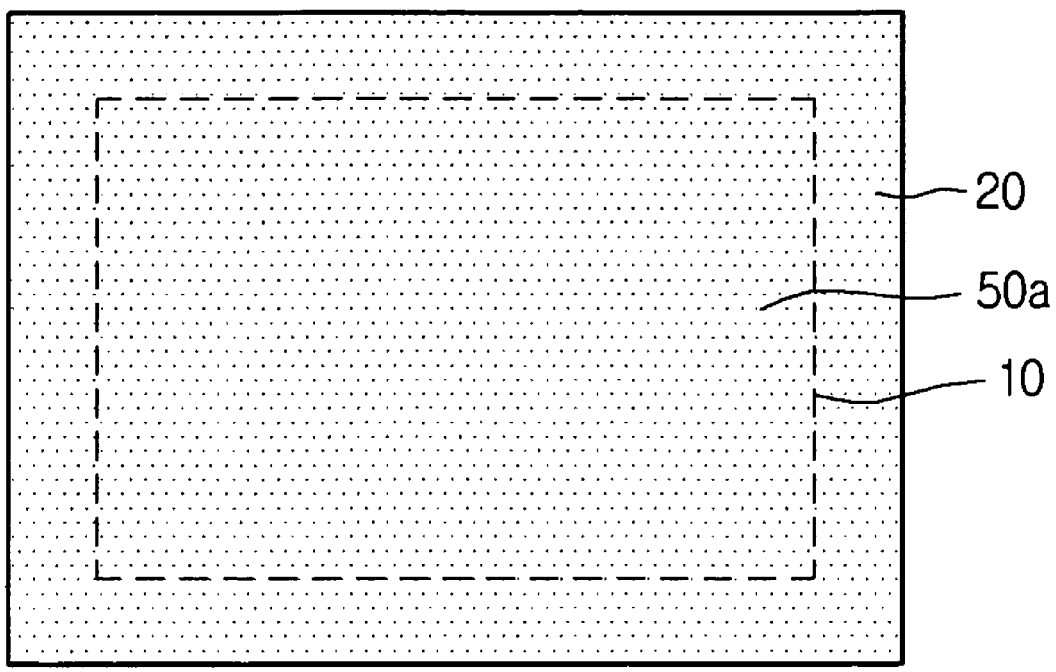
FIG. 3C shows planar and cross-sectional views respectively of a third exemplary step in a method of manufacturing a flexible display device according to an embodiment of the present invention.
Figure 3C:
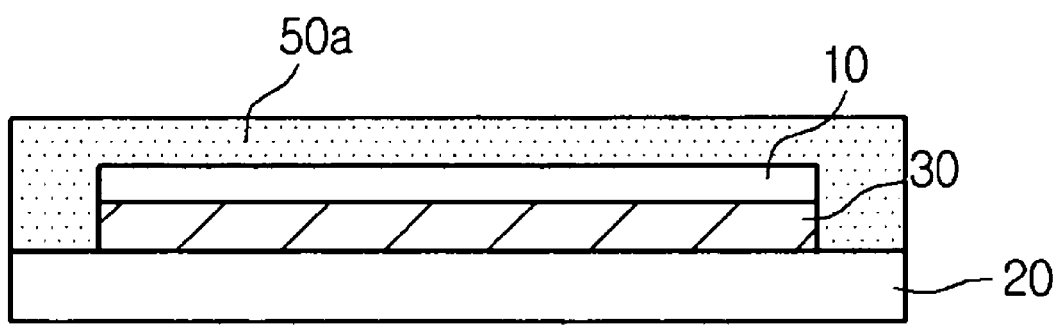

FIG. 3C shows planar and cross-sectional views respectively of a third exemplary step in a method of manufacturing a flexible display device according to an embodiment of the present invention. Referring to FIG. 3C, after the flexible substrate 10 is attached to the adhesive part 30, a preliminary protective layer 50a is disposed to cover an exposed upper surface of the base substrate 20, side surfaces of the adhesive part 30, and side and upper surfaces of the flexible substrate 10. The preliminary protective layer 50a may be formed by a spin coating process to planarize a surface of the flexible substrate 10.

The preliminary protective layer 50a may include an organic material dissolved in a liquid such as a solvent. Thus, the preliminary protective layer 50a may be damaged or etched by etchants or chemicals.

Figure 3D:
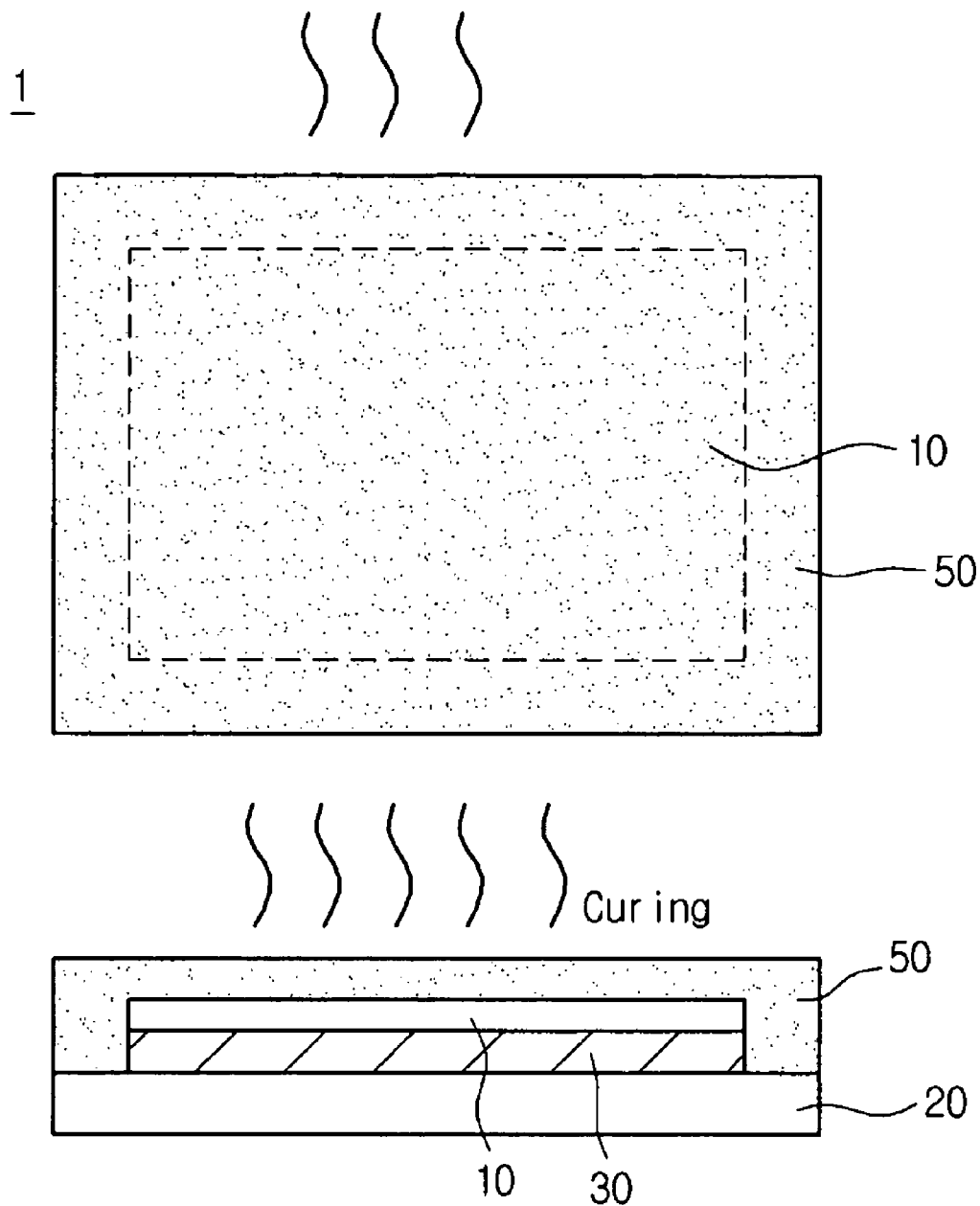
FIG. 3D shows planar and cross-sectional views respectively of a fourth exemplary step in a method of manufacturing a flexible display device according to an embodiment of the present invention.

FIG. 3D shows planar and cross-sectional views respectively of a fourth exemplary step in a method of manufacturing a flexible display device according to an embodiment of the present invention. Referring to FIG. 3D, the preliminary protective layer 50a is cured with heat, pressure, or light to be chemically/physically stabilized. Accordingly, the preliminary protective layer 50a is prevented from being damaged or etched due to etchants (or chemicals). Thus, a protective layer 50 that is chemically/physically stabilized may be formed on the base substrate 20 and the flexible substrate 10 by curing the preliminary protective layer 50a.

The cured protective layer 50 may protect the flexible substrate 10 and the adhesive part 30 from etchants (or chemicals). Alternatively, the curing process may improve adhesion between the protective layer 50 and the base substrate 20, and between the protective layer 50 and the flexible substrate 10. Alternatively, the protective layer 50 may cover upper and side surfaces of the flexible substrate 10 and side surfaces of the adhesive part 30 to prevent damage in the adhesive part 30.

Figure 3E:
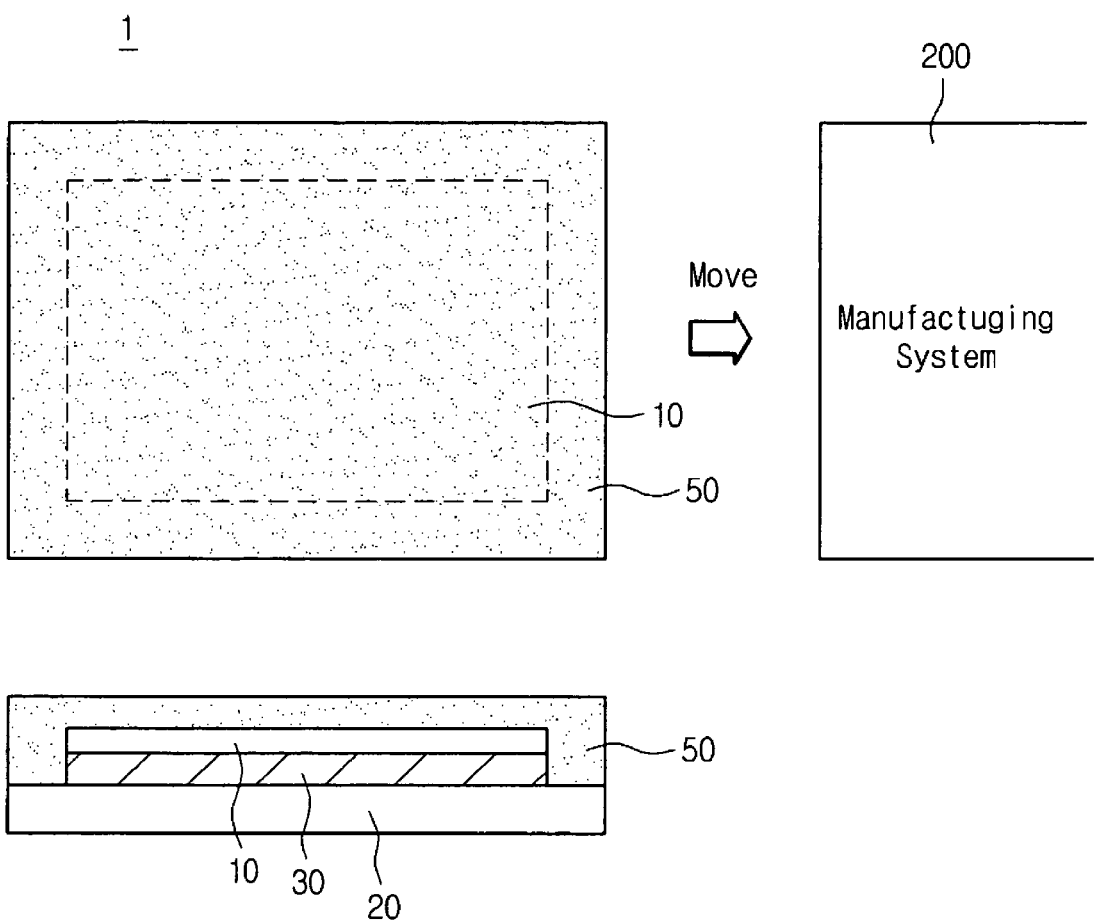
FIG. 3E shows planar and cross-sectional views respectively of a fifth exemplary step in a method of manufacturing a flexible display device according to an embodiment of the present invention.

FIG. 3E shows planar and cross-sectional views respectively of a fifth exemplary step in a method of manufacturing a flexible display device according to an embodiment of the present invention. Referring to FIG. 3E, a flexible display device may be manufactured using the flexible display substrate module 1 fabricated by the processes from FIGS. 3A to 3D. For example, the flexible display substrate module 1 may be moved to a manufacturing system 200 for performing a cleaning process, a pattern forming process, etc, thereby forming the flexible display device. The flexible display substrate module 1 may be cleaned or a pattern may be formed on the flexible display substrate module 1 using the manufacturing system 200.

Figure 3F:
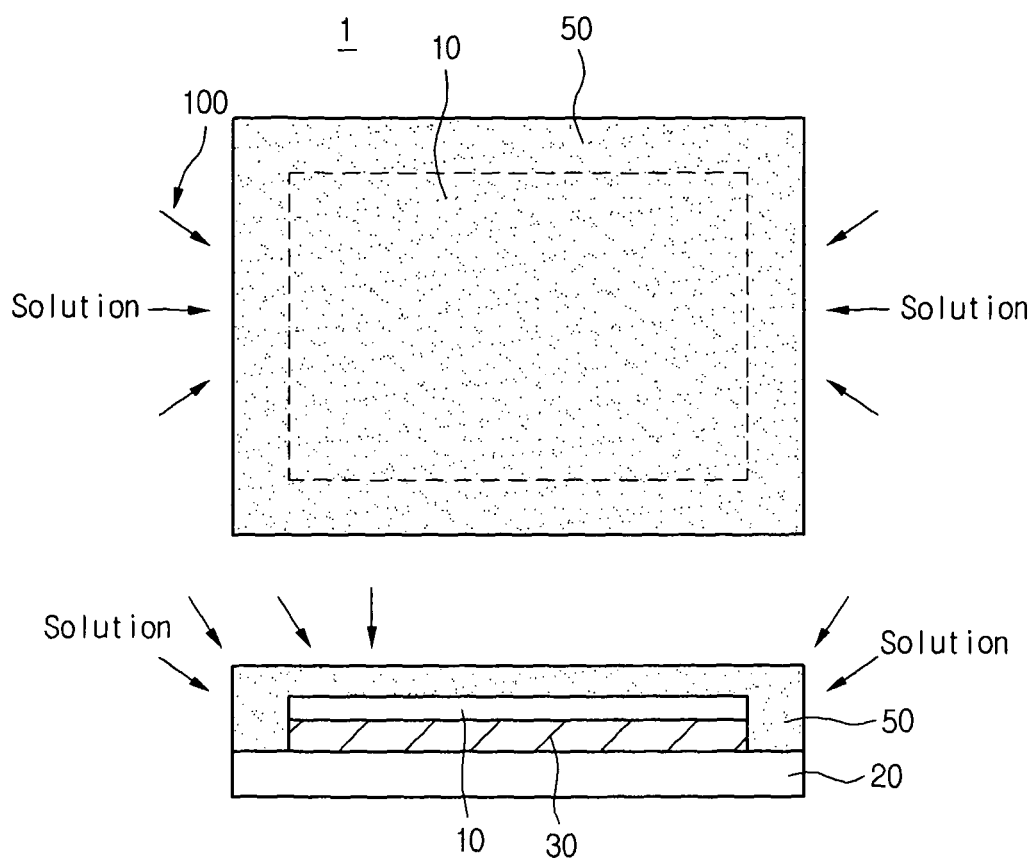
FIG. 3F shows planar and cross-sectional views respectively of a sixth exemplary step in a method of manufacturing a flexible display device according to an embodiment of the present invention.

FIG. 3F shows planar and cross-sectional views respectively of a sixth exemplary step in a method of manufacturing a flexible display device according to an embodiment of the present invention. Referring to FIG. 3F, a process for forming a pattern on the flexible display substrate module 1 may include the following. A conductive material may be deposited on the flexible display substrate module 1 using a deposition process to form a conductive layer and a photoresist layer having the shape of the conductive layer. The photoresist layer is exposed and the photoresist layer divided into cured/non-cured portions is removed using a solution to form a photoresist pattern. The conductive material is etched to the shape of the conductive layer using the photoresist pattern as a barrier layer. Next, the photoresist pattern is removed using a solution for striping the photoresist pattern. The above-described process may be repeatedly performed to form a pattern such as a switching device on the flexible substrate 10.

Next, the flexible substrate 10 is separated from the flexible display substrate module 1 to form the flexible display device. A separating solution may be applied on an interfacing substrate between the flexible substrate module 1 and the adhesive part 30 and an interfacing substrate between the base substrate 20 and the adhesive part 30 to separate the flexible substrate module 1 from the base substrate 20. In an embodiment, a plurality of solutions such as a photoresist pattern solution, an etchant, and a strip solution are used in the aforementioned process. Also, the aforementioned process is repeatedly performed.

In an embodiment of the present invention, the protective layer 50 protects the flexible substrate 10 and the adhesive part 30. Thus, according to an embodiment of the present invention, a flexible display substrate can include a protective layer to cover a flexible substrate and an adhesive part, thus preventing etchants such as a solution from damaging the flexible substrate and the adhesive part.

Moreover, the flexible substrate can be prevented from being separated from the adhesive part. Accordingly, disruption of the flexible display substrate module by the manufacturing system can be minimized thereby stabilizing the manufacturing process for a flexible display device.

It will be apparent to those skilled in the art that various modifications and variations can be made in the liquid crystal display device and method of driving the same of embodiments of the present invention. Thus, it is intended that embodiments of the present invention cover the modifications and variations of the embodiments described herein provided they come within the scope of the appended claims and their equivalents.

What is claimed is:

1. A method of manufacturing a flexible display device, comprising:

providing a base substrate;

adhering an adhesive part including a release paper to the base substrate, wherein the release paper is formed on an upper surface of the adhesive part;

pressing an upper surface of the release paper with a roller after adhering the adhesive part to the base substrate, wherein the adhesive part is formed to be thin and uniformly spread on the base substrate;

detaching the release paper from the adhesive part;

adhering a flexible substrate to the adhesive part;

forming a protective layer covering side surfaces of the flexible substrate and of the adhesive part to form a flexible display substrate;

forming display elements on the flexible display substrate, and separating the flexible substrate from the adhesive part using a separating solution, wherein the separating solution is applied on an interfacial surface between the flexible substrate and the adhesive part and an interfacial surface between the base substrate and the adhesive part, wherein the surface of the protective layer has the same plane in the region of the flexible substrate and in the region of a exposed base substrate, wherein a first portion of the protective layer facing an upper surface of the base substrate is thicker than a second portion of the protective layer facing an upper surface of the flexible substrate, wherein the first portion of the protective layer is disposed on a total region of a peripheral area of the base substrate and a height of the surface of the first portion in the total region of the peripheral area of the base substrate is higher than a height of the surface of the flexible substrate, wherein the adhesive part includes a first adhesive material and a second adhesive material, wherein the first adhesive material has a first adhesive force with respect to the base substrate, and the second adhesive material has a second adhesive force with respect to the flexible substrate, wherein the first adhesive force is substantially different from the second adhesive force, wherein the second adhesive force is smaller than the first adhesive force easily to separate the flexible substrate, wherein the forming of the protective layer includes, forming a preliminary protective layer by covering the base substrate with an organic material; and curing the preliminary protective layer.

2. The method according to claim 1, wherein curing the preliminary protective layer includes one of heating or lighting the preliminary protective layer.

3. The method according to claim 1, wherein the protective layer covers an exposed upper surface of the base substrate.

4. The method according to claim 1, wherein the protective layer covers an upper surface of the flexible substrate.

5. The method according to claim 1, wherein the protective layer is formed by a spin coating process.

6. The method according to claim 1, further comprising pressing an upper surface of the flexible substrate with a roller after adhering the adhesive part to the flexible substrate.

7. The method according to claim 1, wherein a height of the first portion of the protective layer is identical to a height of the second portion of the protective layer.

* * * * *